Patented Aug. 12, 1941

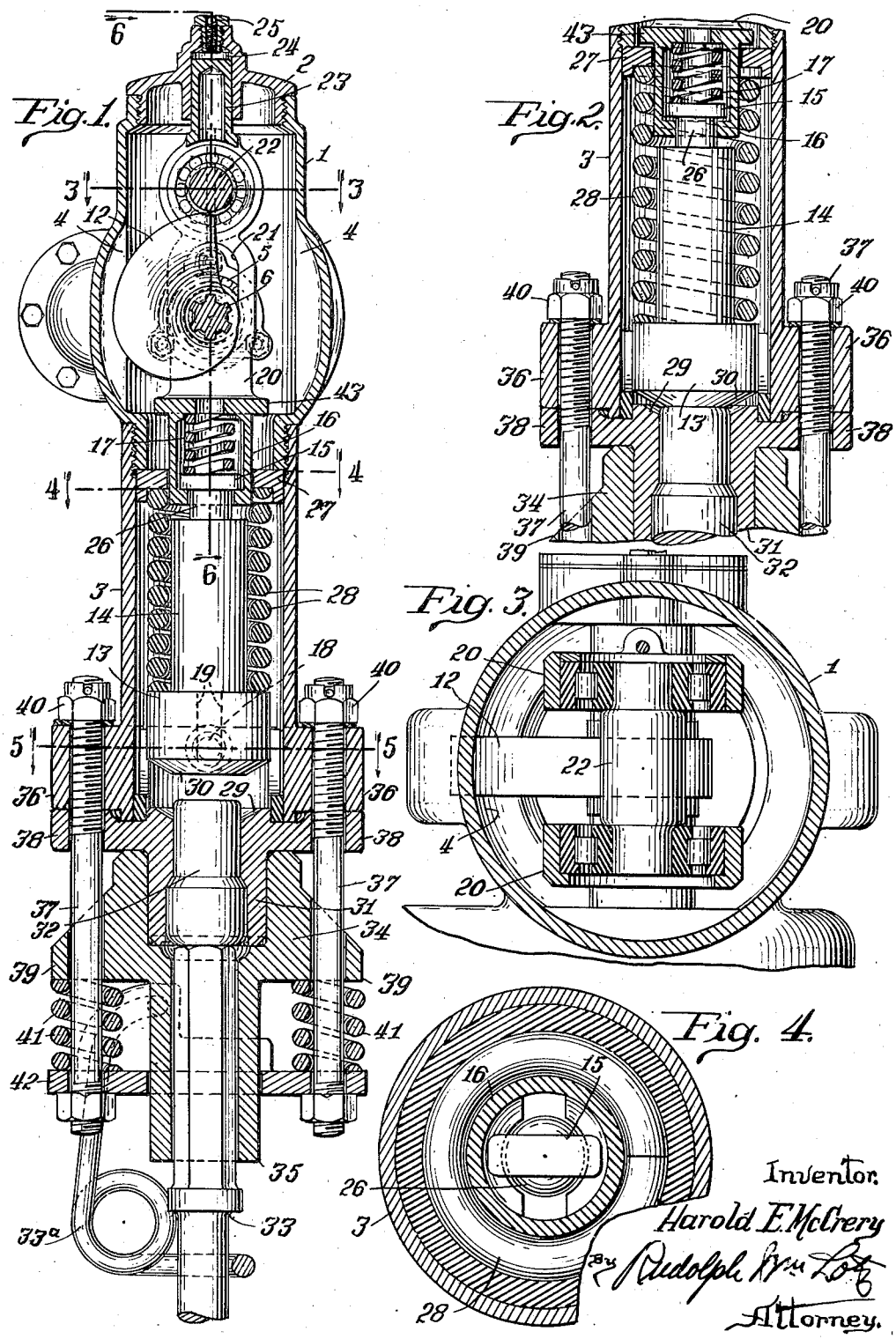

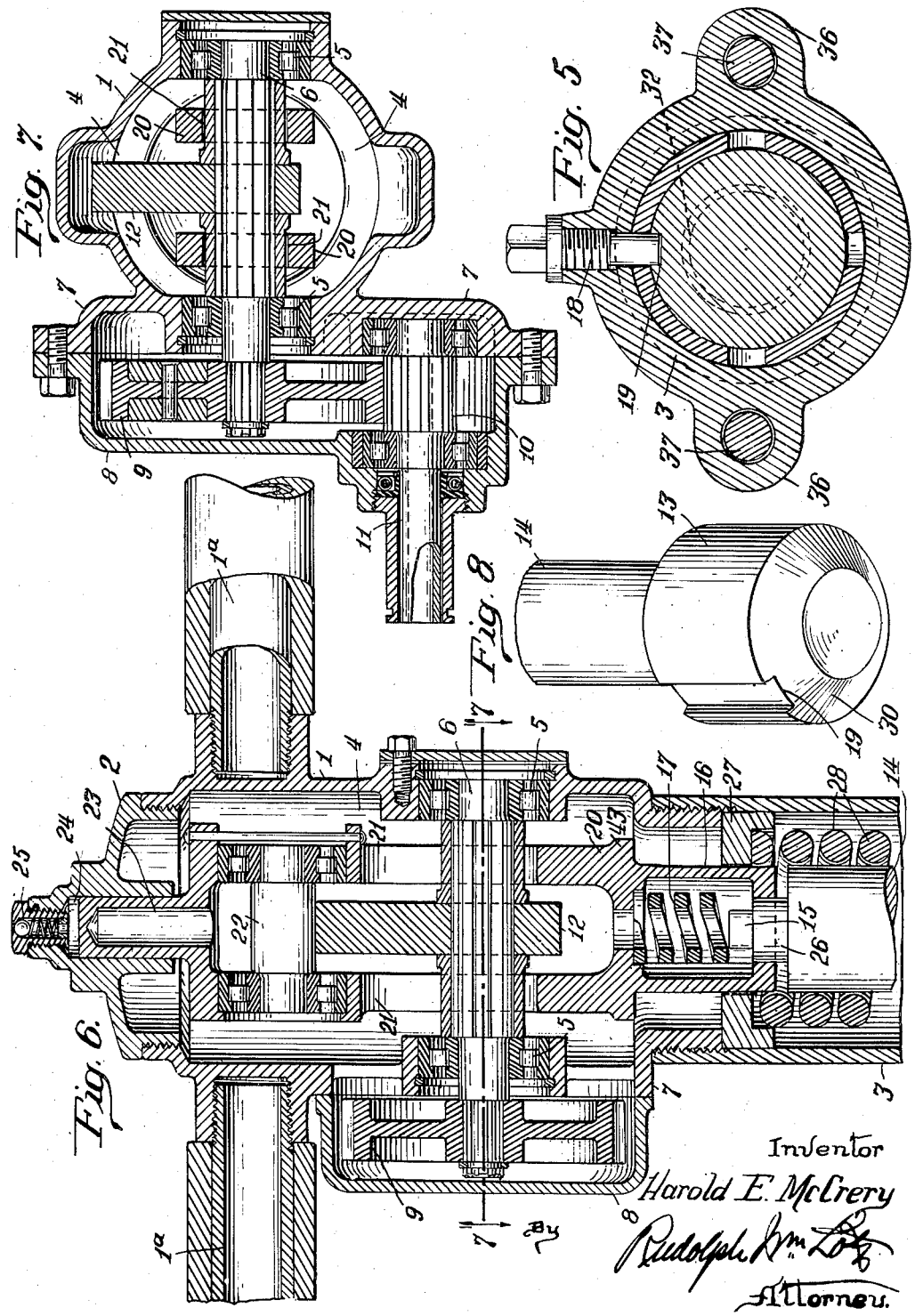

2,252,017

UNITED STATES PATENT OFFICE 2,252,017

MECHANICAL TRIP HAMMER

Harold E. McCrery, Dayton, Ohio, assignor, by direct and mesne assignments, of one-half to Master Vibrator Company, Dayton, Ohio, a corporation of Ohio, and one-half to The Master Electric Company, Dayton, Ohio, a corporation of Ohio Application July 24, 1939, Serial No. 286,154

13 Claims. (Cl. 125—33)

This invention relates to improvements in mechanically actuated tools such as are employed, for example, in breaking up pavements, rock-drilling, chipping castings and the like, and has for its main object to provide a mechanism of this type wherein the rebound resulting from tool impacts upon the objects operated upon are so absorbed as to relieve the operator of shocks.

A further object of the invention is to provide a tool of the aforesaid type which is simple in construction, highly efficient and operable at minimum power cost.

Other objects of the invention are specifically pointed out in or will be readily understood from the following specification.

In the accompanying drawings illustrating a suitable embodiment of the invention—

Fig. 1 is a central longitudinal sectional view of a mechanism constructed in accordance with the invention.

Fig. 2 is a fragmentary detail longitudinal sectional view similar to Fig. 1 showing the hammer element of the structure at its lower spring-actuated limit of movement.

Figs. 3, 4 and 5 are plan sectional views taken, respectively, on the lines 3—3, 4—4 and 5—5 of Fig. 1.

Fig. 6 is a fragmentary detail central longitudinal sectional view on an enlarged scale, taken on the line 6—6 of Fig. 1.

Fig. 7 is a detail transverse sectional view taken on the line 7—7 of Fig. 6.

Fig. 8 is a perspective view of the reciprocable hammer element of the mechanism.

The mechanism comprises a suitable upper casing member 1, a cap 2 for the same, and a lower tubular casing member 3. The said members 2 and 3 are suitably connected rigidly but detachably to the member 1 by screw thread connections.

The member 1 is best shown in plan section in Fig. 3 as composed of a casting of steel or other suitable metal which includes a middle annularly bulged chamber 4 presenting a pair of diametrically opposed cylindrical bosses or extensions in which the roller bearings 5 for the cam shaft 6 are suitably mounted as shown in Fig. 7.

In the instance illustrated one side portion of a gear casing 7 is integral with the casing 1 and is equipped with a cover member 8 into which one end of the shaft 6 projects. The latter carries a spur gear wheel 9 which meshes with the pinion 10 on the drive shaft 11 which is adapted to be connected detachably with a power actuated flexible shaft.

Rigid with the shaft 6 is a came 12 having a face of substantially spiral contour, the largest diameter end of which connects with the radial face of said cam (Fig. 1).

Reciprocably mounted in the portion 3 of the casing is a hammer-plunger 13 equipped with a shank 14. The latter terminates in a cross-head 15 spaced from the end of said shank 14 and is engaged with the lower wall of a cage 16 for a compression spring 17 which bears normally upon said cross-head with an appreciable degree of pressure.

The said lower wall of said cage 16 is equipped with an opening through which the cross-head 15 is passed telescopically and turned through an arc of ninety degrees to the position of Fig. 1 to cause the arms of the cross-head to rest upon side portions of the lower wall of the cage in a well known manner and as particularly shown in Fig. 4. In assembling the shank 14 with the cage 16 the hammer end 13 of the plunger is rendered rotatable relatively to the casing by removal of the guide screw 18 shown in Fig. 5 from engagement in the guide groove 19 of the head 13 (Figs. 5 and 8).

The cage 16 constitutes the lower end portion of a reciprocable plunger 20 equipped between its ends with a longitudinal slot 21 through which the shaft 6 passes, said plunger being also formed to receive the cam 12 and being equipped with an antifriction roller 22 which rides upon said cam.

The said plunger 20 terminates at its upper end in a cylindrical projection 23 which fits telescopically the cylinder 24 of the cap 2. The latter is equipped at its upper end with a self-closing check valve 25 which permits air to enter the cylinder 24 responsively to suction caused by the down stroke of the plunger 20 which effects compression of air in the cylinder on its upstroke which forces its way past the projection 23 and effects air circulation through the casing.

The neck portion 26 of the shank 14 is of appreciably greater length than the thickness of the bottom wall of the cage 16 to allow for relative movement between the plunger 20 and the shank 14 against the action of the spring 17.

Abutting the lower end of casing 1 within the casing member 3 is a collar 27 between which and the head of the hammer portion 13 a compression spring 28 is disposed, the latter being preferably of such length when completely expanded as to just barely occupy the space between said collar and said head 13 when the latter is disposed in the position of Fig. 2 or in contact with the annular shoulder 29 to which its lower beveled edge 30 is opposed. In the latter event the spring 28 will be under very slight compression when disposed in the position of Fig. 2.

The said shoulder 29 is disposed at the upper end of the bearing 31 for the plunger 32 constituting the tool striking element which transmits the blow of the member 13 to the tool 33, the latter being disposed at the upper limit of its movement, shown in Fig. 1 by imposing the entire weight of the casing upon the same while it rests upon the object to be broken, chipped or otherwise acted upon. The tool 33 is easily removed and replaced and is prevented from dropping out of its guide by means of the conventional retaining device 33a.

The bearing 31 abuts the lower end of the casing member 3 and is mounted in a cavity in the upper or collar portion 34 of the tool guide 35.

The casing member 3 is equipped at its lower end with diametrically opposed bracket projections 36 bored to receive the shanks of bolts 37 and against which the lower ends of the side projections 38 of the bearing 31 abut. The bolts 37 pass through openings in the side projections 38 and the side projections 39 of said head 34 and through the bores of the bracket projections 36, the said bolts being suspended from the projections 36 by their heads 40.

The head portion 34 of the tool guide and the bearing 31 are slidable on said bolts 37 against the action of compression springs 41 interposed between the lower ends of the side projections 39 and a plate 42 which is disposed loosely about the tool guide and is suspended from said bolts.

The casing 1 is equipped with conventional handle bars 1a.

Suitable conventional means, not illustrated, are provided for associating and disassociating the shaft 6 from the source of power without disconnecting the shaft 11 from the flexible shaft so that the operator may interrupt operation of the mechanism at intervals as desired or required.

The length of stroke of the plunger 20 is less than the length of the radial face of the cam 12 and is determined by the distance between the upper end of the cage 16, or flange 43, and the collar 27. That distance is appreciably greater than the length of stroke of the plunger hammer 13 from the position of Fig. 1 to the point of which the shoulders 29 and 30 meet.

Thus the roller 22 cannot strike the hub portion of the cam 12 after the point of greatest radius of the cam passes said roller. It is also apparent that the flange 43 of the plunger 20 cannot strike the collar 27 because of the shorter maximum stroke of the hammer plunger 13 than the distance separating the flange 43 of the plunger 20 from the collar 27, except under the influence of momentum of the plunger 20 against the action of the spring 17.

The operation of the above-described mechanism is as follows:

The operator grasps the handle bars, sets the tool 33 to rest upon the object to be operated upon and lets the casing down so that the entire weight thereof rests upon the tool 33. He then actuates the device which connects the shaft 11 with the source of power to cause said shaft to be rotated and thus effects rapid reciprocation of the plunger 20 to alternately raise the same and the hammer-plunger 13 against the action of the spring 28 and trip the same.

At the instant next preceding the tripping of said plungers, the parts of the structure are in the position shown in Fig. 1 so that the plunger 20 is pulled downwardly with plunger 13 responsively to the expansion of the spring 28.

The resistance to the blow of the tool 33 upon the object resulting from impact of head 13 upon tool head 32 will determine the length of downward stroke of head 13 and will not normally exceed the limit fixed by the beveled shoulder 29.

The impact of hammer 13 on the tool head 32 projects the tool 33, as far as the head 13 moves it, as a general rule. But it may move a greater distance, as for example to cause the lower end of the head 32 to strike the annular shoulder of the member 34. This would occur, obviously, before the beveled edge 30 of hammer plunger 13 strikes the shoulder 29 and from this point on the tool head will cause the member 34 to be moved against the action of the springs 41, thus causing the latter to resist further downward movement of head 13 so that its blow, if any, upon the shoulder 29 will be cushioned.

Preferably, as above pointed out, the length of the spring 28, when fully expanded, is that which is shown in Fig. 2, further downward movement of said head 13 being due to its momentum plus the action of the spring 17. At the point in the stroke of the head 13 shown in Fig. 3, the tool head 33 will be substantially in contact with the shoulder 43 and further movement of both tool 33 and head 13 will then be against the action of the springs 41.

Obviously, the plunger 20 is quite heavy and its momentum, after tripping, will be such as to cause it to continue downward after head 13 has attained the lower limit of its movement against the resistance to movement of the tool 33 due to the hardness of the object operated upon and the springs 41. Thus the plunger 20 will cause the spring 17 to be compressed to some degree but at the instant that this compression occurs, the rebound of the tool 33 occurs and that rebound is transmitted to the head 13 to cause it to move upwardly against the action of both springs 17 and 28. But as spring 28 is practically fully expanded at this instant, it will impart only a very light impact against the collar 27 which is hardly perceptible to the operator. At the same instant that this occurs the spring 17 is taking up rebound shock and is throwing the plunger 20 upwardly to the then limit of its movement determined by contact of the lower wall of the cage 16 with the cross-head 15. This upward movement of plunger 20 is cushioned to some extent by the dash-pot action of the plunger 23 and cylinder 24 and reacts in part against the spring 28.

At substantially the instant that the plunger 20 is thrown upwardly, as last described, the cam 12 again engages the collar 22 to draw said plungers 20 and 13 back to the upper limits of their movement, the contour of the spiral face of the cam being such that this return movement is most rapid at the start and is rendered progressively slower until the roller 22 is again riding upon the highest point in the cam. The return stroke of plunger 20 is thus most rapid during the period of least resistance of the spring 28 and is slower progressively as that resistance increases.

The maximum length of movement of the plunger 20 is such that the roller 22 cannot ever strike the hub portion of the cam during its downstroke, said roller being, so to speak, picked up by the cam during the rebound of the plunger 20 as above described.

At the instant of this pick-up of the roller 22 by the cam 12 the resistance to rotation of said cam is substantially zero and thus between the instant of tripping and the instant of such pick-up the shaft 6 rotates under no load resistance through a short arc. Power consumption is thus minimized due to the fact that the fly-wheel of the engine can pick up momentum during that brief interval of free rotation of the shaft 6 and that momentum is utilized at the beginning of rotation of the cam 12 next following the instant of pick-up of the roller 22.

The spring 17 may be under some degree of constant compression or may be fully expanded normally. In either event it seems certain that the kinetic action of the plunger 20 is being exerted upon the spring 17 at the instant of rebound of the tool and acts to neutralize that rebound to an appreciable degree at least, so that its reaction on the head 13 is reduced appreciably and probably to such an extent that the spring 28 is not affected to absorb any of the rebound shock. This cannot be determined definitely, but is deemed to be correct because the operator feels no appreciable rebound, if any, since the latter cannot be transmitted to the casing by the plunger 20 except through the hammer plunger and the spring 28.

It is preferred that the spring 28 be of the length hereinabove indicated, though it may be of somewhat greater length to exert pressure upon the head 13 to force the same below the limit of its movement normally fixed by the shoulder 29 without appreciably affecting the tendency of the entire casing to rebound responsively to the rebounding action of tool 33, due to the fact that regardless of the length of the spring 28, the spring 17 is still effective to take up most of the rebound of the tool 33 which is also resisted by the weight of the entire casing of the device and, plus the bearing 31 and the tool guide head 34, inertia of which at the instant of rebound of tool 33 is appreciable and difficult to overcome as will be obvious.

I claim as my invention:

1. In a mechanism of the type set forth, a reciprocable tool, a reciprocable hammer for actuating said tool, a spring for projecting the hammer in a direction to actuate the tool, a reciprocable plunger connected with said hammer and movable relatively thereto axially thereof, a spring interposed in said connection for maintaining said plunger at one limit of its movement relatively to the hammer, and a rotatable trip cam for drawing the plunger and hammer away from the tool and compressing the first-named spring.

2. In a mechanism of the type set forth, a reciprocable tool, a reciprocable hammer for actuating said tool, a spring for projecting the hammer in a direction to actuate the tool, said spring being substantially fully expanded when said hammer has attained its initial tool actuating position, a reciprocable plunger connected with said hammer and movable relatively thereto axially thereof, a spring interposed in said connection for maintaining said plunger at one limit of its movement relatively to the hammer, and a rotatable trip cam for drawing the plunger and hammer away from the tool and compressing the first-named spring.

3. In a mechanism of the type set forth, a reciprocable tool, a reciprocable hammer for actuating said tool, a spring for projecting the hammer in a direction to actuate the tool, a reciprocable plunger connected with said hammer and movable relatively thereto axially thereof, a spring interposed in said connection for maintaining said plunger at the lower limit of its movement relatively to the hammer, and a rotatable trip cam for drawing the plunger and hammer away from the tool and compressing the first-named spring without affecting the second-named spring.

4. In a mechanism of the type set forth, a reciprocable tool, a reciprocable hammer for actuating said tool, a spring for projecting the hammer in a direction to actuate the tool, said spring being substantially fully expanded when said hammer has attained its initial tool actuating position, a reciprocable plunger connected with said hammer and movable relatively thereto axially thereof, a spring interposed in said connection for maintaining said plunger at one limit of its movement relatively to the hammer, and a rotatable trip cam for drawing the plunger and hammer away from the tool and compressing the first-named spring without affecting the second-named spring.

5. A trip hammer mechanism including a reciprocable tool, a spring projected hammer for actuating said tool, a mechanism for moving the hammer away from the tool against the action of its spring and then releasing the same for projection by said spring, and a normally expanded cushioning spring operatively interposed between said hammer and said mechanism and movable in expanded form with said hammer during the tool actuating stroke of the latter for absorbing rebound shock of said tool following each actuation thereof by said hammer.

6. A trip hammer mechanism including a reciprocable tool, a reciprocable hammer, a spring for projecting the hammer in a direction to actuate the tool, said spring being substantially fully expanded when said hammer has attained its initial tool-actuating position, a trip mechanism for moving the hammer against the action of said spring, said mechanism including a reciprocable plunger connected with said hammer and interposed between the latter and said mechanism, a spring interposed between said hammer and said plunger for maintaining the latter at the outer limit of its movement relatively to the hammer and permitting said plunger to move in the direction of projection of said hammer as the latter moves in its tool actuating direction.

7. A trip hammer mechanism including a reciprocable tool, a reciprocable hammer, a spring for projecting the hammer against the tool, said spring being substantially fully expanded before the hammer attains the limit of its spring-responsive stroke, a trip mechanism for moving the hammer against the action of said spring, said mechanism including a reciprocable plunger connected with said hammer and interposed between the latter and said mechanism, a spring interposed between said hammer and said plunger for maintaining the latter at the outer limit of movement relatively to the hammer and permitting said plunger to move with the hammer in the spring responsive direction of projection of said hammer.

8. A trip hammer mechanism including a tool, a hammer adapted to actuate said tool, a spring for projecting the hammer in a direction to actuate the tool, a trip mechanism, a member operatively associated with said trip mechanism and connected with said hammer for actuating the latter against the action of said spring, and a cushioning means interposed between said member and said hammer for permitting limited movement of said member relatively to said hammer as the latter attains its tool actuating position, said spring being fully expanded before said hammer attains the limit of its tool actuating movement.

9. A trip hammer mechanism including a trip mechanism, a reciprocable plunger actuated in one direction thereby, a hammer connected with said plunger, a spring for actuating said plunger and hammer in the other direction, a tool disposed for actuation by said hammer, a shock absorbing cushion interposed between said hammer and plunger for permitting limited relative movement of the same in the direction of spring projection thereof, and a dashpot associated with said plunger for resisting movement thereof in the direction opposite to said spring-projection of same.

10. A trip hammer mechanism including a casing equipped at its upper end with a cylinder, a check-valve controlled intake port for the same, a trip mechanism in said casing, a reciprocable plunger actuated in one direction by said mechanism, a hammer connected with said plunger, a spring for actuating the latter and said hammer in the other direction, a tool disposed in the path of the spring projected stroke of said hammer and a cushioning means interposed in the connection between said plunger and said hammer for permitting movement of the former relatively to the latter in the direction of the said spring-responsive stroke, said plunger including a piston end portion reciprocable in said cylinder.

11. A trip hammer mechanism including a trip mechanism, a reciprocable plunger actuated in one direction thereby, a hammer connected with said plunger, a spring for actuating said plunger and hammer in the other direction, a tool disposed for actuation by said hammer, a shock absorbing cushion interposed between said hammer and plunger for permitting limited relative movement of the same in the direction of spring projection thereof, and a dashpot associated with said plunger for resisting movement thereof in the direction opposite to said spring projection of same, said spring being fully expanded before said hammer attains the limit of its spring-responsive stroke.

12. A trip hammer mechanism including a casing equipped at its upper end with a cylinder, a check-valve controlled intake port for the same, a trip mechanism in said casing, a reciprocable plunger actuated in one direction by said mechanism, a hammer connected with said plunger, a spring for actuating the latter and said hammer in the other direction, a tool disposed in the path of the spring projected stroke of said hammer and a cushioning means interposed in the connection between said plunger and said hammer for permitting movement of the former relatively to the latter in the direction of the said spring-responsive stroke, said plunger including a piston end portion reciprocable in said cylinder, said spring being fully expanded before said hammer attains the limit of its spring-responsive stroke.

13. A trip hammer mechanism including a casing equipped at its upper end with a cylinder, a check valve controlled intake port for the same, a trip mechanism in said casing, a reciprocable plunger actuated in one direction by said mechanism, a hammer connected with said plunger, a spring for actuating the latter and said hammer in the other direction, a tool disposed in the path of the spring projected stroke of said hammer, a normally partially compressed spring, and a cushioning means interposed in the connection between said plunger and said hammer for permitting movement of the former relatively to the latter in the direction of the said spring responsive stroke, said plunger including a piston end portion reciprocable in said cylinder.

HAROLD E. McCRERY.